(12) United States Patent
McCune et al.

(10) Patent No.: US 8,104,289 B2
(45) Date of Patent: Jan. 31, 2012

(54) SYSTEMS AND METHODS INVOLVING MULTIPLE TORQUE PATHS FOR GAS TURBINE ENGINES

(75) Inventors: Michael E. McCune, Colchester, CT (US); Brian D. Merry, Andover, CT (US); Gabriel L. Suciu, Glastonbury, CT (US)

(73) Assignee: United Technologies Corp., Hartford, CT (US)

( * ) Notice: Subject to any disclaimer, the term of this patent is extended or adjusted under 35 U.S.C. 154(b) by 944 days.

(21) Appl. No.: 11/868,982

(22) Filed: Oct. 9, 2007

(65) Prior Publication Data

US 2009/0092487 A1    Apr. 9, 2009

(51) Int. Cl.
*F02C 7/00* (2006.01)
(52) U.S. Cl. .......................................... 60/779; 60/226.1
(58) Field of Classification Search ............... 60/39.162, 60/39.163, 226.1, 779; 415/122.1, 68, 69; 416/126
See application file for complete search history.

(56) References Cited

U.S. PATENT DOCUMENTS

| | | | |
|---|---|---|---|
| 3,121,526 A * | 2/1964 | Morley | 415/66 |
| 3,792,586 A * | 2/1974 | Kasmarik et al. | 60/226.1 |
| 4,270,408 A | 6/1981 | Wagner | |
| 4,344,336 A | 8/1982 | Carriere | |
| 4,651,521 A * | 3/1987 | Ossi | 60/226.3 |
| 4,870,270 A * | 9/1989 | Brennan | 250/227.21 |
| 4,916,894 A * | 4/1990 | Adamson et al. | 60/226.1 |
| 6,612,195 B2 | 9/2003 | Gmirya et al. | |
| 6,883,750 B2 | 4/2005 | Gmirya | |
| 7,363,757 B2 * | 4/2008 | Loisy | 60/226.1 |
| 2003/0097893 A1 | 5/2003 | Gmirya et al. | |
| 2005/0011307 A1 | 1/2005 | Gmirya | |
| 2005/0011990 A1 | 1/2005 | Gmirya | |
| 2006/0192046 A1 | 8/2006 | Heath et al. | |
| 2006/0266883 A1 | 11/2006 | Gmirya | |
| 2006/0269414 A1 | 11/2006 | Palcic et al. | |
| 2008/0317588 A1 * | 12/2008 | Grabowski et al. | 415/174.1 |
| 2009/0000270 A1 * | 1/2009 | Kupratis | 60/224 |

* cited by examiner

*Primary Examiner* — Louis Casaregola
*Assistant Examiner* — Phutthiwat Wongwian

(57) ABSTRACT

Systems and methods involving multiple torque paths of gas turbine engines are provided. In this regard, a representative spool assembly for a gas turbine engine, which incorporates a compressor, a turbine and a gear assembly, includes: a shaft operative to be driven by the turbine; a first spool segment operative to couple the shaft to the compressor; and a second spool segment operative to couple the shaft to the gear assembly. The first spool segment and the second spool segment are not coupled to each other.

14 Claims, 3 Drawing Sheets

SYSTEMS AND METHODS INVOLVING MULTIPLE TORQUE PATHS FOR GAS TURBINE ENGINES

BACKGROUND

1. Technical Field

This disclosure generally relates to gas turbine engines.

2. Description of the Related Art

A gas turbine engine typically incorporates a spool that mechanically interconnects rotating components of a turbine with rotating components of a corresponding compressor. In order to accommodate axial loads of the spool, one or more thrust bearings typically are provided. Unfortunately, mechanical failure of a spool forward of the thrust bearing can decouple the load provided by the fan and compressor from the turbine, thereby resulting in an overspeed of the turbine. Such an overspeed can be severe enough to cause turbine disks and blades to fail structurally. Specifically, structural failure of a turbine disk can cause the disk to break into multiple pieces and depart the engine by penetrating a casing that surrounds the turbine. In order to alleviate this concern, turbine disks and associated blades oftentimes are designed to accommodate such overspeed conditions resulting in the use of heavier, more robust components.

SUMMARY

Systems and methods involving multiple torque paths of gas turbine engines are provided. In this regard, an exemplary embodiment of a method for reducing overspeed potential of a turbine of a gas turbine engine comprises: providing a first load to the turbine via a first torque path; providing a second load to the turbine via a second torque path; and operating the turbine such that: mechanical failure of a component defining at least a portion of the first torque path does not inhibit the second load from being applied to the turbine via the second torque path; and mechanical failure of a component defining the second torque path does not inhibit the first load from being applied to the turbine via the first torque path.

An exemplary embodiment of a spool assembly for a gas turbine engine, which includes a compressor, a turbine and a gear assembly, comprises: a shaft operative to be driven by the turbine; a first spool segment operative to couple the shaft to the compressor; and a second spool segment operative to couple the shaft to the gear assembly. The first spool segment and the second spool segment are not coupled to each other.

An exemplary embodiment of a gas turbine engine comprises: a turbine; a shaft operative to be driven by the turbine; a compressor; a first spool segment coupling the shaft to the compressor; a gear assembly; a second spool segment coupling the shaft to the gear assembly; and a fan operative to be driven by the gear assembly. The first spool segment is operative to transfer torque from the shaft to the compressor and not to the gear assembly; and the second spool segment is operative to transfer torque from the shaft to the gear assembly and not to the compressor.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving multiple torque paths for gas turbine engines are provided. In this regard, several exemplary embodiments will be described. In particular, these embodiments incorporate the use of multiple torque paths, e.g., two such paths, that are used to transfer torque from the turbine of a gas turbine engine to other components. For example, one of the torque paths can be used for transferring torque to a compressor, while the another torque path can be used for providing torque to a gearbox, which is used to rotate a fan. Notably, use of separate torque paths can potentially prevent an overspeed condition of a turbine when one or more components defining one of the torque paths mechanically fails. That is, even if one of the torque paths experiences a mechanical failure that uncouples a load from the turbine, the component being driven by the other of the torque paths still provides a load to the turbine. In some embodiments, this ability to prevent turbine overspeed potentially allows for use of less robust, and oftentimes lighter, components in the turbine which can result in improved gas turbine engine efficiency.

Figure 1:
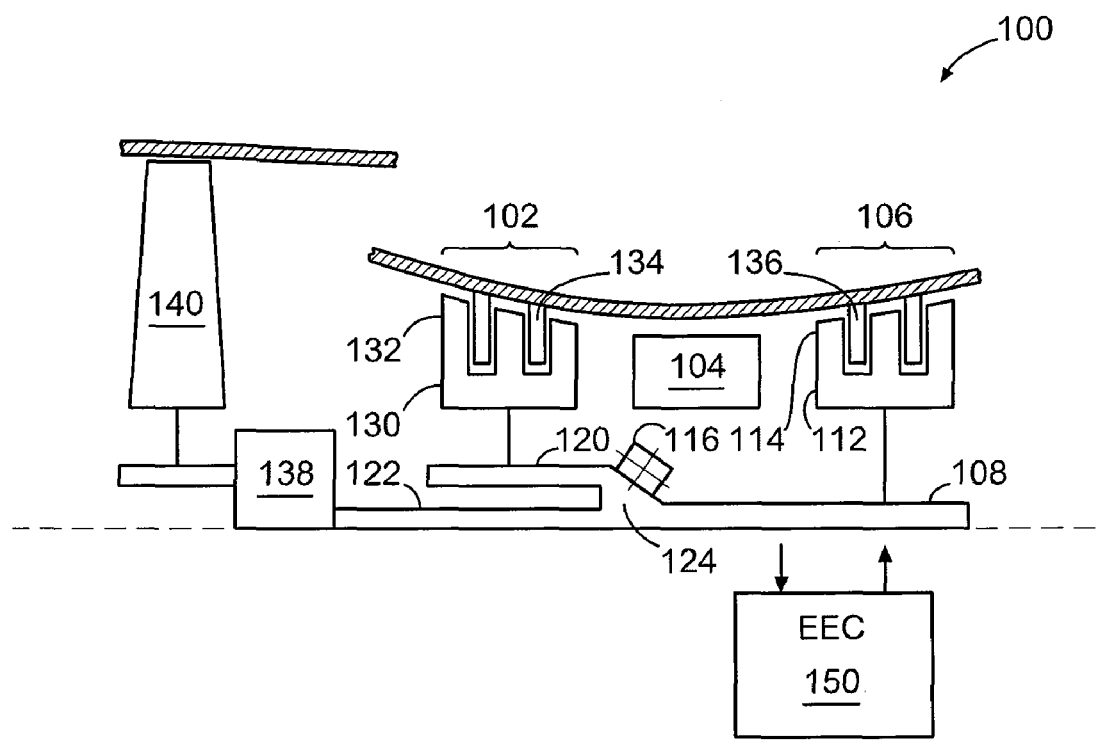
FIG. 1 is a schematic diagram depicting an embodiment of a system involving multiple torque pads.

Referring now in more detail to the drawings, FIG. 1 is a schematic diagram depicting an exemplary embodiment of a system involving multiple torque paths. As shown in FIG. 1, system 100 is generally configured as a geared turbofan gas turbine engine that incorporates a compressor 102, a combustion section 104, a turbine 106 (e.g., a high pressure turbine) and a shaft 108. The shaft 108 is mechanically coupled to rotating components of the turbine, including turbine disks (such as turbine disk 112) and associated blades (such as blades 114).

From the turbine, shaft 108 extends forward to the compressor. However, in contrast to gas turbine engines that include a single torque path for each spool, two torque paths are provided forward of a thrust bearing 116. In particular, system 100 includes a first torque path or spool segment 120 and a second torque path or spool segment 122. The spool segments 120, 122 interconnect with the shaft at an intersection 124 located adjacent to thrust bearing 116. Notably, the thrust bearing accommodates axial loads of the shaft and prevents movement of the shaft in an aft direction, i.e., toward the turbine, if the first and second spool segments were to fail.

Spool segment 120 is mechanically coupled to the compressor. That is, the first spool segment is mechanically coupled to compressor 130, which includes blades (e.g., blade 132). Notably, vanes (e.g., vein 134) are interposed between the rotating sets of compressor blades.

Spool segment 122 is mechanically coupled to a gearbox 138. Gearbox 138 is used to provide torque to a gear-driven fan 140.

An electronic engine control (EEC) 150 also is provided. The EEC 150 receives inputs corresponding to engine operating parameters and provides corresponding outputs for controlling operation of the gas turbine engine. Although desirable, it should be noted that the EEC may not be able to adequately control rotating speed of a turbine responsive to a total failure of a spool forward of a thrust bearing. In contrast to a spool that provides a single torque path from the turbine forward of a thrust bearing, the embodiment of FIG. 1, however, potentially alleviates this situation by dividing the torque provided by the turbine between multiple torque paths; in this case, first and second torque paths.

Figure 2:
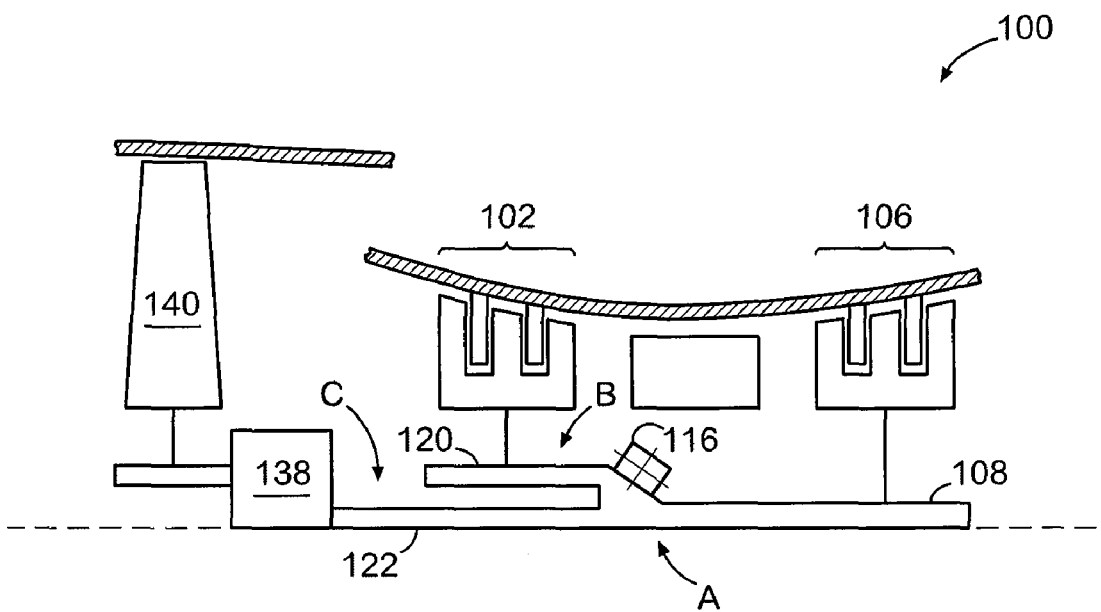
FIG. 2 is a schematic diagram of the embodiment of FIG. 1, showing representative regions of potential mechanical failure.

In this regard, reference is made to the schematic diagram of FIG. 2, which identifies three general areas of spool 108 that may be subjected to mechanical failure. In particular, FIG. 2 depicts location A (located aft of thrust bearing 116), location B (located along spool segment 120), and location C (located along spool segment 122). Notably, mechanical failure of the spool at location A causes the portion of the spool aft of the failure to move axially aft. As such, the turbine blades tend to clash with the adjacent vanes. Although resulting in turbine failure, such blade clashing may reduce a tendency of the turbine to overspeed to the point of turbine disk liberation.

In contrast, mechanical failure of the first spool segment 120 (location B) results in load of the gearbox and the gear-driven fan being applied via the second spool segment 122 to the turbine. Similarly, mechanical failure of the second spool segment 122 (location C) results in load of the compressor being applied via the first spool segment 120 to the turbine. Since at least a portion of the normal operating load is still applied to the turbine via a remaining torque path despite failure of one of the spool segments, the EEC may have adequate time to respond to any sensed failure. As such, the EEC may be able to provide outputs to reduce the rotational speed of the turbine, thereby potentially avoiding a critical overspeed.

Figure 3:
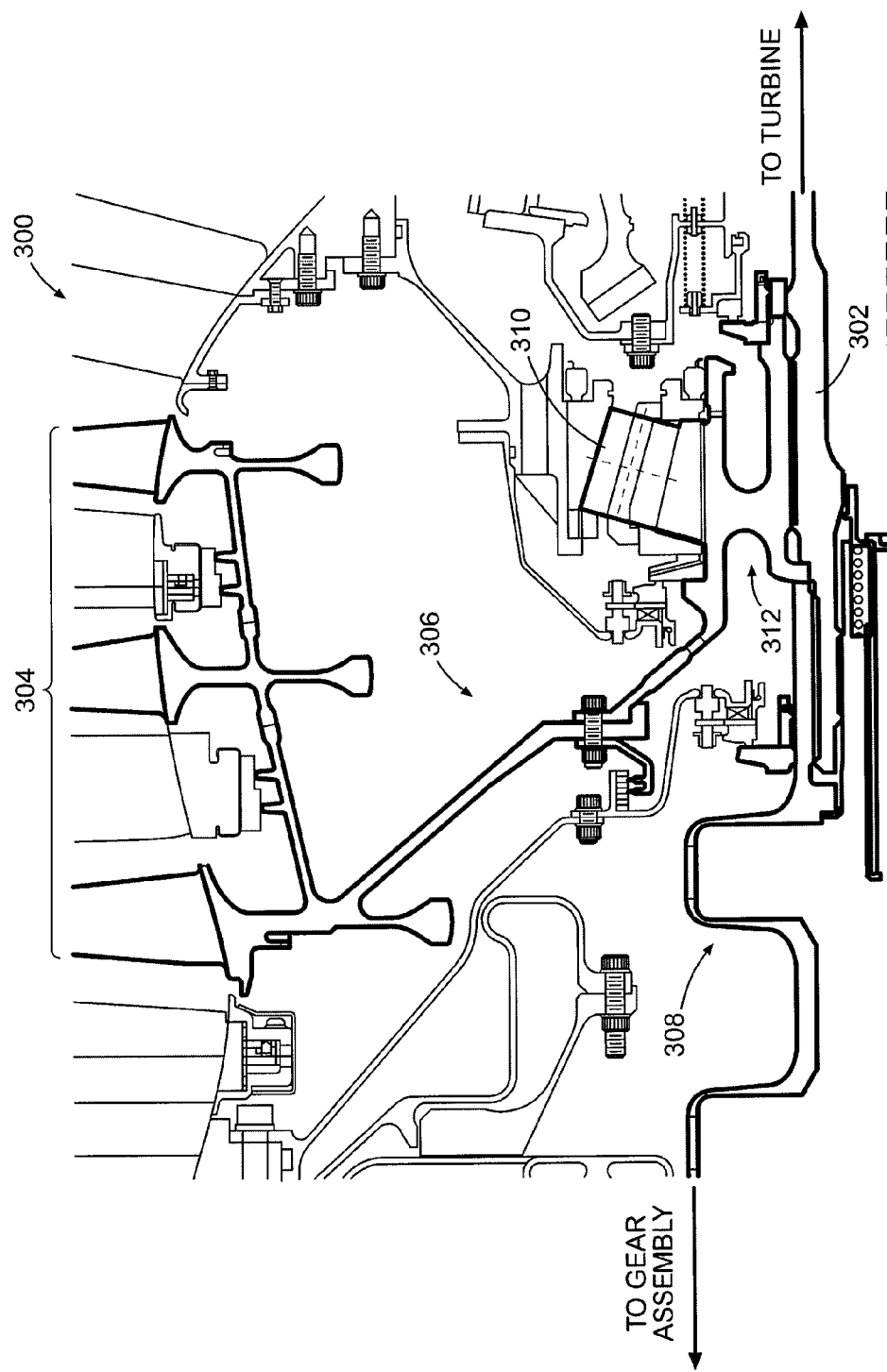
FIG. 3 is a schematic diagram depicting another embodiment of a system involving multiple torque paths.

FIG. 3 is a schematic diagram of another embodiment of a system involving multiple torque paths. In particular, FIG. 3 schematically depicts a portion of a gas turbine engine 300 including a shaft 302, a compressor 304, a first torque path 306, a second torque path 308 and a thrust bearing 310. Note that the rotating components of the gas turbine are shaded to visually distinguish those components from other components of the gas turbine.

In operation, torque is provided from a turbine (not shown) to compressor 304 via shaft 302 and torque path 306. Additionally, torque is provided from the turbine to a gearbox (not shown) via shaft 302 and torque path 308. Note that the torque path 306 diverges from torque path 308 at an intersection 312, which is located in a vicinity of the thrust bearing 310.

Figure 4:
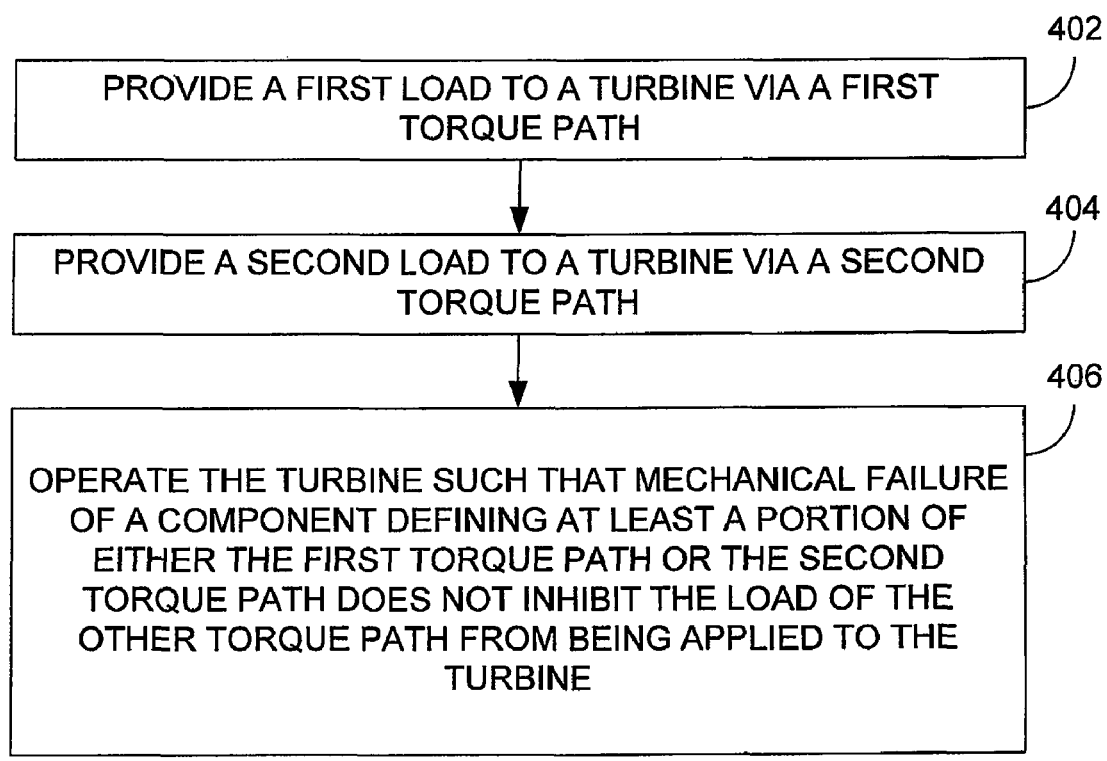
FIG. 4 is a flowchart depicting functionality of an embodiment of a system involving multiple torque paths.

FIG. 4 is a flowchart depicting functionality of an embodiment of a system involving multiple torque paths. Specifically, FIG. 4 depicts an embodiment of a method for reducing overspeed potential of a power turbine of a gas turbine engine. In this regard, the functionality (or method) may be construed as beginning at block 402, in which a first load is provided to the turbine via a first torque path. In some embodiments, the first load can be associated with a compressor of the gas turbine engine. In block 404, a second load is provided to the turbine via a second torque path. In some embodiments, the second load can be associated with a gear assembly of the gas turbine engine. In block 406, the turbine is operated such that: mechanical failure of a component defining at least a portion of the first torque path does not inhibit the second load from being applied to the turbine via the second torque path; and mechanical failure of a component defining the second torque path does not inhibit the first load from being applied to the turbine via the first torque path.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine comprising:
   a turbine;
   a shaft operative to be driven by the turbine;
   a compressor;
   a first spool segment coupling the shaft to the compressor, which first spool segment is mechanically connected to the shaft;
   a gear assembly;
   a second spool segment coupling the shaft to the gear assembly;
   a fan operative to be driven by the gear assembly; and
   a thrust bearing supporting the shaft and operative to inhibit aft movement of the shaft, which thrust bearing is located at the mechanical connection between the first spool segment and the shaft;
   wherein the first spool segment is operative to transfer torque from the shaft to the compressor and not to the gear assembly; and
   wherein the second spool segment is operative to transfer torque from the shaft to the gear assembly and not to the compressor.

2. The gas turbine engine of claim 1, wherein the turbine is located aft of the compressor.

3. The gas turbine engine of claim 1, wherein the thrust bearing is located aft of the first spool segment and the second spool segment.

4. The gas turbine engine of claim 1, wherein the thrust bearing is located adjacent an intersection of the first spool segment, the second spool segment and the shaft.

5. The gas turbine engine of claim 2, wherein, in operation and responsive to mechanical failure of the shaft aft of the thrust bearing, portions of the turbine driven by the shaft move aft and contact vanes of the turbine.

6. The gas turbine engine of claim 1, further comprising:
   a casing annularly surrounding the turbine; and
   an electronic engine control operative to receive inputs corresponding to engine operating parameters and to provide outputs to control operation of the engine, the electronic engine control being further operative to configure the outputs to reduce rotational speed of the turbine responsive to a failure of at least one of the first spool segment and the second spool segment such that a portion of the turbine does not penetrate the casing.

7. The gas turbine engine of claim 1, wherein the second spool segment is operative to load the turbine despite a mechanical failure of the first spool segment.

8. The gas turbine engine of claim 1, wherein the first spool segment is operative to load the turbine despite a mechanical failure of the second spool segment.

9. The gas turbine engine of claim 1, wherein the turbine is a high pressure turbine.

10. The gas turbine engine of claim 1, wherein the engine is a turbofan gas turbine engine.

11. A spool assembly for a gas turbine engine having a compressor, a turbine and a gear assembly, the spool assembly comprising:
   a shaft operative to be driven by the turbine;

a first spool segment mechanically coupled to the shaft and operative to apply a load from the compressor to the shaft;
a second spool segment coupled to the shaft and operative to apply a load from the gear assembly to the shaft; and
a thrust bearing supporting the shaft and operative to inhibit aft movement of the shaft, which thrust bearing is located adjacent an intersection between the first spool segment and the shaft;
wherein the first spool segment and the second spool segment are not coupled to each other.

12. The spool assembly of claim 11, wherein the first spool segment is operative to transfer torque from the shaft to the compressor and not to the gear assembly.

13. The spool assembly of claim 11, wherein the second spool segment is operative to transfer torque from the shaft to the gear assembly and not to the compressor.

14. The spool assembly of claim 11, wherein the thrust bearing is operative to engage the assembly aft of the first spool segment and the second spool segment.

* * * * *